July 14, 1964  H. F. STERLING  3,140,922
METHODS AND APPARATUS FOR TREATING REACTIVE MATERIALS
Original Filed Feb. 26, 1959  2 Sheets-Sheet 1
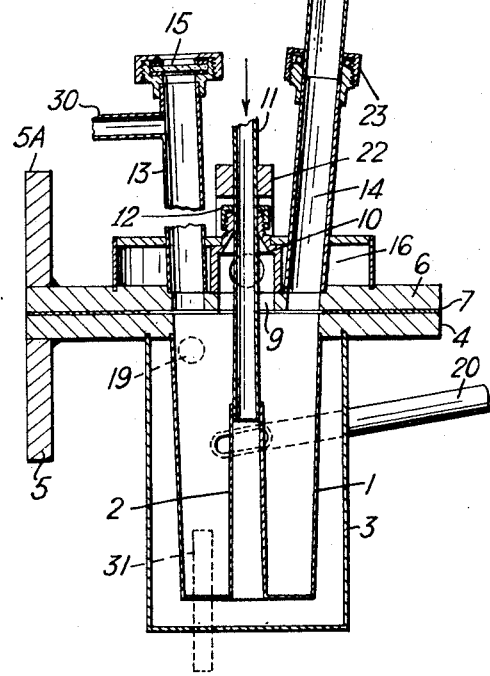
Fig. 1.
Inventor
H.F. Sterling
By 
Attorney

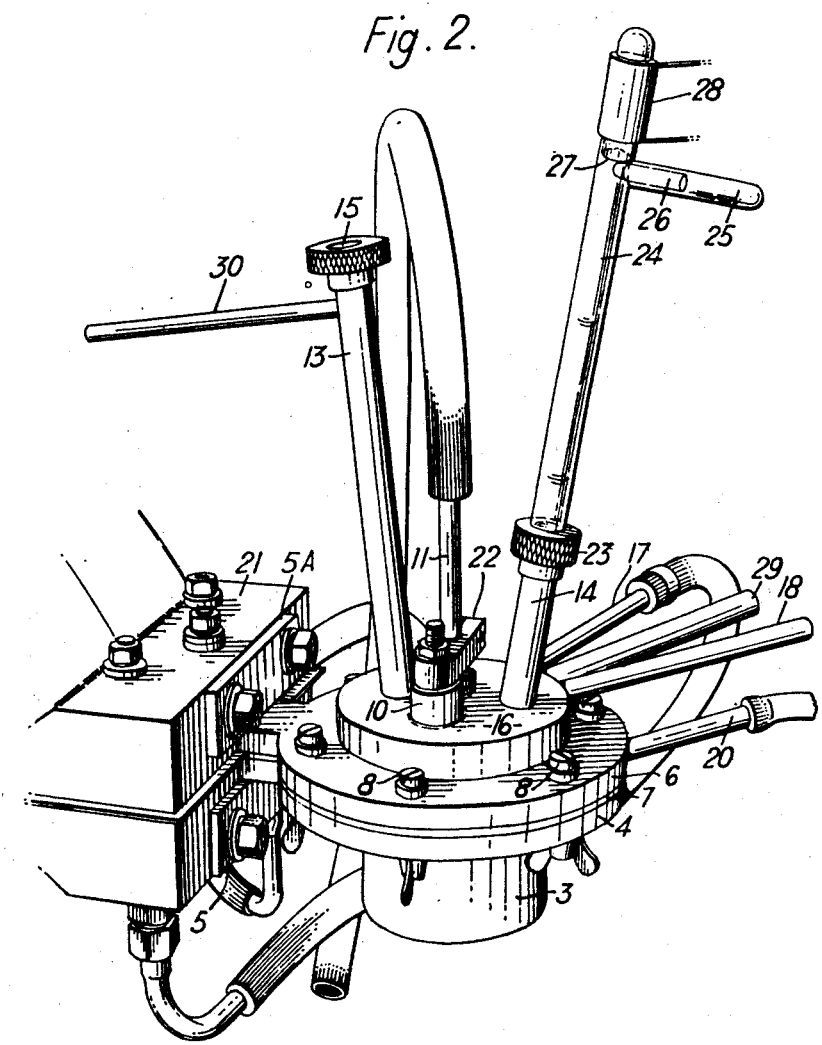

United States Patent Office 3,140,922
Patented July 14, 1964

3,140,922
METHODS AND APPARATUS FOR TREATING REACTIVE MATERIALS
Henley Frank Sterling, London, England, assignor to International Standard Electric Corporation, New York, N.Y., a corporation of Delaware
Original application Feb. 26, 1959, Ser. No. 795,635. Divided and this application Feb. 27, 1961, Ser. No. 92,051
Claims priority, application Great Britain Mar. 25, 1958
6 Claims. (Cl. 23—277)

This invention relates to apparatus for treating reactive materials.

This application is a division of Serial No. 795,635, filed February 26, 1959, now abandoned.

Examples of materials that are reactive when molten or when raised to a high temperature are such metals as titanium, zirconium, iron and uranium and some semi-conductors of which silicon is a conspicuous example.

For the melting of titanium or its alloys or zirconium an arc struck within a water cooled copper vessel has been used. An arc, however, introduces some contamination from the electrodes into the material.

According to the present invention there is provided a container for treating reactive materials comprising two coaxial tubes and a member which covers the space between them at one end, the said tubes and member being made of a metal of high thermal and electrical conductivity, means for circulating cooling fluid through the inner tube and around the outer tube, and means connecting the inner and outer tubes to the terminals of a radio frequency power supply.

The invention will be better understood from the following description of one embodiment thereof taken in conjunction with the accompanying drawing.

FIG. 1 shows in cross-section and FIG. 2 in perspective apparatus for the treatment of silicon and for the production of silicon by the decomposition of silane.

A container 1 for the material to be treated is constructed with a central axial tube 2. The container 1 and tube 2 are preferably constructed of either copper or silver. The container 1 is surrounded by a jacket 3, for example, of copper and the tube 2 communicates at its lower end with the space between the container 1 and the jacket 3. A heavy copper plate 4 closes the space between the container 1 and the jacket 3 and is welded to a copper flange 5. A second copper plate 6 fits over the plate 4 with the interposition of an electrically insulating washer 7 and is welded to a flange 5A. The plates 4 and 6 and the washer 7 are bolted together by bolts 8 (FIG. 2) which are insulated from both the plates 4 and 6.

The upper plate 6 is furnished with a central aperture 9 over which is a boss 10 welded to the plate 6. A water inlet tube 11 of copper is welded to the central axial tube 2 and passes through the boss 10 with a vacuum seal 12. The seal 12 is composed of electrically insulating material. Apertures are also provided in plate 6 for an inspection tube 13 and for another tube 14 the purpose of which will be described hereinafter. The upper end of the inspection tube 13 is closed by a glass plate 15 secured to the end of the tube by a vacuum tight seal.

The ends of tubes 13 and 14 are surrounded by a water jacket 16 through which water may be circulated by means of tubes 17 and 18 (FIG. 2).

Water for keeping the walls of the container 1 cooled is circulated in through the tube 11 and out by a tube 19 (not shown in FIG. 2). A tube 20 passes through the outer jacket 3 and opens into the wall of the container 1 tangentially thereof.

The flanges 5 and 5A of the plates 4 and 6 are connected to the terminals of the secondary of a transformer 21, FIG. 2, the primary of which is supplied with radio frequency energy from a suitable source. The flange 5 transmits the energy from the terminal to which it is connected to the outer wall 1 of the crucible. The flange 5a transmits the energy from the other terminal via plate 6, the boss 10, the heavy copper strapping 22 which connects the boss 10 to the exterior of tube 11, and finally via tube 11 to the inner crucible wall 2. High frequency energy is thus supplied between the central tube 2 and outer coaxial wall 1 which thus constitute inner and outer conductors of a coaxial transmission line, short circuited at one end, for the high frequency energy supplied. The high frequency field in this transmission line is utilised for the treatment of reactive materials.

As an example, the use of the above apparatus for the decomposition of silane to silicon will be described. For this purpose it is necessary to place a preliminary charge of silicon within the furnace and this charge must be sufficiently preheated to lower the resistance thereof to a point at which eddy currents can be induced therein by the high frequency field. For the purpose of introducing this charge into the furnace, the upper end of tube 14 is joined by a vacuum tight joint 23 to a charging tube 24, which may be of high purity silica. In a side branch 25 of tube 24 is a plunger 26 which protrudes into the tube 24 and holds a slug 27 of silicon in the upper portion of tube 24. A resistance coil 28 (not shown in FIG. 2) is placed over the upper portion of tube 24 to surround the slug 27. Coil 28 is supplied with suitable current to heat it and thereby heat the slug 27 by radiant heat. When the slug 27 has been heated to the temperature of dull red heat the plunger 26 is operated, for example, by an external magnet and the slug 27 drops into the furnace. Here it is melted by the eddy currents induced therein.

Silane is then passed in through the tube 20. The silane is decomposed in the furnace to silicon and hydrogen. The silicon is deposited on to the pool of molten silicon already present and is melted while the hydrogen and any undecomposed silane is drawn out through an outlet tube 29.

The conditions in which decomposition of silane to silicon is effected may vary over a wide range. For example, the silane may be diluted with an inert gas such as argon to the same molecular concentrations (less than normal) as described in British Patent No. 745,698. To assist in checking the required degree of vacuum (or pressure) within the furnace, the sight tube 13 is provided with a side connection 30 for a manometer (not shown).

On a restricted surface it is possible to increase the concentration and pressure of the silane which is decomposed provided the temperature within the furnace is maintained above 600° C. By means of this invention it is thus possible to obtain a higher rate of production of very pure silicon than in the process according to the above mentioned patent.

It can be seen that using my apparatus and method no contamination of the silicon from the walls of the furnace will occur. Although the apparatus has been described above for the decomposition of silane to silicon it is equally useful for any treatment of other highly reactive materials such as titanium, zirconium, iron and uranium, which treatment involves melting of the substance. The apparatus may also be used for the production of other semi-conductors such as germanium and boron by decomposition of a gaseous compound thereof in a manner similar to that used for the decomposition of silane to silicon.

The process may become a continuous one by providing an overflow tube 31, FIG. 1, sealed into the container 1 in a vacuum tight manner so that when molten material accumlates in the container 1 to the height of the tube 31 it overflows down this tube into a suitable container.

It is clear also that although the coaxial furnace has been shown as placed vertically it could equally well be arranged horizontally or at any desired angle to the horizontal.

What I claim is:

1. A container for treating reactive materials comprising two coaxial tubes and a member which covers the space between them at one end, the said tubes and member forming the crucible in which the material is treated, the said tubes and member being made of a metal of high thermal and electrical conductivity, means for circulating cooling fluid through the inner tube and around the outer tube, and means connecting the inner and outer tubes to the terminals of a radio frequency power supply thus utilizing the tubes themselves as coaxial conductors of the radio frequency supply.

2. A container according to claim 1 in which the connecting means comprises two disc-like members separated by a layer of insulating material which form the lid of the container, each of the said disc-like members being electrically connected to a different one of the said coaxial tubes.

3. A container according to claim 2 which further comprises a projecting tube and means connected to the said projecting tube whereby material may be preheated before being introduced into the said container.

4. A container according to claim 3 and further comprising means for introducing gaseous compounds into the said container.

5. A container according to claim 4 and further comprising means for removing excess material from the said container.

6. A container according to claim 5 and further comprising means for inspecting the inside of the said container during the treatment of the said reactive materials.

References Cited in the file of this patent

UNITED STATES PATENTS

| | | |
|---|---|---|
| 2,013,652 | Hall | Sept. 10, 1935 |
| 2,828,201 | Findlay | Mar. 25, 1958 |
| 2,935,386 | Selker | May 3, 1960 |

FOREIGN PATENTS

| | | |
|---|---|---|
| 546,346 | Canada | Sept. 17, 1957 |